United States Patent [19]
Salazar

[11] Patent Number: 6,009,906
[45] Date of Patent: *Jan. 4, 2000

[54] METHOD AND APPARATUS FOR PREVENTING PIPE DAMAGE

[76] Inventor: Dennis R. Salazar, 2902 El Corto Dr. SW, Albuquerque, N.Mex. 87105

[*] Notice: Under 35 U.S.C. 154(b), the term of this patent shall be extended for 442 days.

[21] Appl. No.: 08/693,588

[22] Filed: Jul. 23, 1996

Related U.S. Application Data

[63] Continuation-in-part of application No. 08/268,298, Jun. 29, 1994, Pat. No. 5,538,043.

[51] Int. Cl.[7] .................................................. E03B 7/12
[52] U.S. Cl. ........................ 138/28; 138/26; 138/32
[58] Field of Search ................................ 138/26, 27, 28, 138/32, 113; 137/59; 267/259

[56] References Cited

U.S. PATENT DOCUMENTS

| | | |
|---|---|---|
| 318,856 | 5/1885 | Bilz . |
| 329,881 | 11/1885 | Benton .................................. 138/28 X |
| 596,062 | 12/1897 | Firey ........................................ 138/28 |
| 926,092 | 6/1909 | Bright .................................. 138/28 X |
| 1,643,021 | 9/1927 | Luyties . |
| 2,029,630 | 2/1936 | McMichael ............................. 138/28 |
| 2,495,693 | 1/1950 | Byrd, Jr. et al. .......................... 138/26 |
| 2,599,325 | 6/1952 | Fritzberg ................................. 138/28 |
| 2,629,402 | 2/1953 | Cook ....................................... 138/28 |
| 2,701,583 | 2/1955 | Rux .......................................... 138/26 |
| 2,852,033 | 9/1958 | Orser ..................................... 137/108 |
| 3,070,132 | 12/1962 | Sheridan ............................... 138/118 |
| 3,143,861 | 8/1964 | Dumas ...................................... 61/42 |
| 3,665,967 | 5/1972 | Kachnik ................................. 138/137 |
| 3,860,353 | 1/1975 | Lukasik et al. ..................... 267/259 X |
| 4,156,127 | 5/1979 | Sako et al. ........................... 138/33 X |
| 4,215,726 | 8/1980 | Tagami ................................ 138/28 X |
| 4,440,154 | 4/1984 | Bellows ............................. 138/113 X |
| 4,649,959 | 3/1987 | Wadleigh ................................ 138/28 |
| 4,651,781 | 3/1987 | Kandelman ............................. 138/30 |
| 4,770,211 | 9/1988 | Olsson .................................... 138/32 |
| 4,773,448 | 9/1988 | Francis ................................... 138/28 |
| 5,339,865 | 8/1994 | Asghar et al. ........................... 138/26 |
| 5,538,043 | 7/1996 | Salazar ................................... 138/26 |

FOREIGN PATENT DOCUMENTS

| | | | |
|---|---|---|---|
| 1046124 | 12/1953 | France .................................... 138/28 |
| 1219487 | 5/1960 | France .................................... 138/28 |
| 2115488 | 2/1985 | United Kingdom . |
| 15138 | 7/1992 | United Kingdom ..................... 138/28 |

OTHER PUBLICATIONS

Uk Patent Application GB 2,115,488, Feb. 1982.

*Primary Examiner*—Patrick Brinson
*Attorney, Agent, or Firm*—Jeffrey D. Myers; Rod D. Baker

[57] ABSTRACT

An apparatus and method for protecting a pipe from damage due to excessive internal pressure, such as the pressures resulting from water freezing within the pipe. A compressible core apparatus is disclosed for placement within the pipe. Methods for placing the core in the pipe, connecting core sections together, and attaching the core to the pipe are disclosed. The invention is suitable for simple application to complex pipeline systems.

10 Claims, 6 Drawing Sheets

METHOD AND APPARATUS FOR PREVENTING PIPE DAMAGE

CROSS-REFERENCE TO RELATED APPLICATIONS

This application is a continuation-in-part application of U.S. patent application Ser. No. 08/268,298, entitled "Method and Apparatus for Preventing Pipe Damage", to Dennis R. Salazar, filed on Jun. 29, 1994, now U.S. Pat. No. 5,538,043 issued Jul. 23, 1996 the teachings of which are incorporated herein by reference.

BACKGROUND OF THE INVENTION

1. Field of the Invention (Technical Field)

The invention relates to an apparatus for protecting pipes, conduits, tubes, and the like against damage resulting from excessive pressures therein, particularly expansion damage due to the freezing of aqueous solutions contained therein.

2. Background Art

A number of efforts have been undertaken to fashion an apparatus or method whereby pipes and conduits may be protected against the damage resulting from the expansion of freezing water or aqueous solutions in the pipes or conduits. It has long been known that water, especially standing water, within closed pipes will expand upon freezing. As water undergoes the phase shift from liquid to solid, it expands in volume; crystal lattices of solid ice occupy substantially more volume than an equal weight of liquid water. When such expansion occurs within the confines of a closed tube, tremendous pressures are exerted radially outward against the interior wall of the tube. If unrelieved, such pressures can split or fracture the tube, resulting in damages that can be very costly to repair. Repairs can be particularly difficult if the damaged tube or pipe is located within a confined space, under a concrete slab, or within a wall, or the like.

U.S. Pat. No. 318,856 to Bilz, entitled *Water Pipe,* discloses a pipe having a liner fashioned from a series of ring-shaped sections of cork. U.S. Pat. No. 596,062 to Firey, entitled *Device for Preventing Bursting of Freezing Pipes,* discloses the use of a rubber or hollow metallic core mounted with flanges within a length of straight pipe. U.S. Pat. No. 1,643,021 to Luyties, entitled *Construction of Pipes and the Like,* discloses a pipe having a compressible liner made of a binder and filler mixture, such as asphalt and ground cork. The liner is applied to the pipe prior to the installation of the pipe. U.S. Pat. No. 2,629,402 to Cook, entitled *Antiburst Tube for Pipes,* discloses a tube, composed of a plurality of discrete compressible cells linked in series. U.S. Pat. No. 2,852,033 to Orser, entitled *Anti-Surge Assembly,* showing a device incorporating a resilient material to ameliorate the effects of pressure fluctuations in hydraulic assemblies. U.S. Pat. No. 3,665,967 to Kachnik, entitled *Supercharge Hose,* shows a fluid-carrying conduit surrounded by a body of resilient material adapted to absorb undulations of the conduit caused by pressure changes within the conduit. U.S. Pat. No. 4,651,781 to Kandelman, entitled *Distributed Accumulator,* discloses an inner conduit and outer conduit and compressible material disposed in the region between the conduits to absorb shock waves resulting from pressure changes in the inner conduit. U.S. Pat. No. 4,773,448 to Francis, entitled *Freeze-Resistant Plastic Pipe and method for its manufacture,* shows a method for simultaneously extruding a hard outer pipe shell and a soft resilient pipe liner to form a lined pipe. United Kingdom Patent Application No. GB 2,115,488A to Christie, et al., entitled *Pressure Surge Attenuator,* shows a thin walled inner pipe surrounded by a hard outer housing, with crushable metal foam disposed between inner pipe and outer housing to absorb pressure surges in the inner pipe.

SUMMARY OF THE INVENTION

The present invention is of a method of and apparatus for protecting a pipeline against damage resulting from excessive internal pressures, comprising: providing a core comprising: a flexible, compressible, resilient trunk comprising a composition inert to water; and a flexible reinforcing jacket, comprising a composition inert to water, disposed around the trunk; and disposing the core within the pipeline; and attaching a first portion of the core to the pipe by: placing a first compression clip within the pipe; and securing the core to the first compression clip. In the preferred embodiment, the invention further comprises attaching a second portion of the core to the pipe by: placing a second compression clip within the pipe; and securing the core to the second looped compression clip. The first compression clip is preferably a looped compression clip and the core is secured through a loop of the looped compression clip. Alternatively, securing the core is done by securing the core through a spring clip. The reinforcing jacket preferably comprises a durable material inert to water such as vinyl, rubber, an elastomer, woven filaments, or webbing.

The present invention is also of a method of and apparatus for protecting a pipeline against damage resulting from excessive internal pressures, comprising: providing a core comprising: a flexible, compressible, resilient trunk comprising a composition inert to water; and at least one flexible reinforcing filament, comprising a composition inert to water, disposed within the trunk; and disposing the core within the pipeline; and attaching a first portion of the core to the pipe by: placing a first compression clip within the pipe; and securing the core to the first compression clip. In the preferred embodiment, the invention further comprises attaching a second portion of the core to the pipe by: placing a second compression clip within the pipe; and securing the core to the second looped compression clip. The first compression clip is preferably a looped compression clip, and securing the core is done by securing the core through a loop of the looped compression clip. Alternatively, securing the core may be done by securing the core through a spring clip, or tying the core to the first compression clip.

A primary object of the present invention is to provide a means and method for protecting water pipes from damage due to freezing.

A primary advantage of the present invention is that it is easily practiced with either new or existing pipes.

Another advantage of the present invention is that it can be practiced in pipes made from nearly any material composition.

Another advantage of the present invention is that it poses no risk of contaminating or affecting the purity of the transported fluid.

Another advantage of the invention is that it can be easily practiced to protect entire pipeline systems, including pipe junctions, forks, and bends.

Another advantage of the apparatus of the invention is that it is long lasting, yet easily removed and replaced if necessary.

Another advantage of the apparatus of the invention is that it is inexpensive.

Another advantage of the apparatus of the invention is that it is easily transported and stored in bulk.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The invention relates to an apparatus and method for preventing damage to pipes and conduits resulting from expansive freezing of solutions therein. The invention may also have useful application as a means and method of protecting pipes from damage due to other sources of excessive internal pressure, such as rapid pressure surges and "water hammer."

The invention may be practiced within previously installed pipes, or alternatively may be practiced within pipes at the time of their manufacture. Throughout this specification and the claims, "pipe," "line," and "pipeline" mean a tube, conduit, or closed plenum structure intended to hold or transport a fluid, particularly water or an aqueous solution.

The invention finds ready application in any circumstances where pipe protection against expansive freezing is desired. The use of the invention obviates the need to drain water-filled pipe during periods of freezing weather. Exemplary applications include, but are not limited to, landscape sprinkler systems, recreational vehicles having on-board water supplies, livestock watering systems, roof-mounted air conditioning water supply lines, and the like. In the case of exterior sprinkler systems, for example, the use of the invention permits the shallow installation of the water lines, thus reducing installation costs. Similarly, use of the invention may permit intermittently/seasonally used or occupied appliances and dwellings to remain unheated during inclement weather, where continuous heating may ordinarily is required to guard against line freezing. While the invention is most particularly suited for practice within rigid pipes, it may find valuable application within flexible hoses as well.

Figure 1:
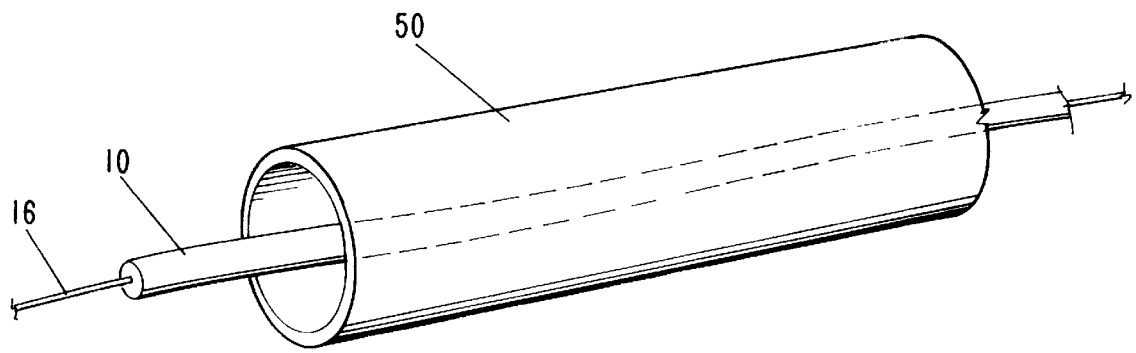
FIG. 1 is a perspective view of the apparatus of the invention disposed within a pipe.
Figure 2:
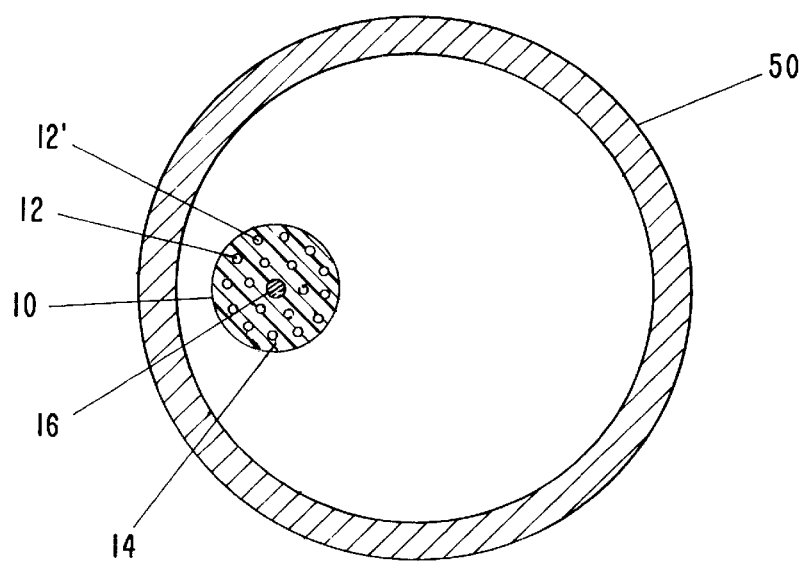
FIG. 2 is an end sectional view of the FIG. 1 embodiment.

Reference is made to FIGS. 1 and 2, showing an embodiment of the core apparatus 10 of the invention disposed within an arbitrary length of pipe 50. The apparatus of the invention includes a trunk 14 fashioned from a resilient, flexible, elastic material, (e.g. silicone, fluorinated polymer, and the like) surrounding at least one tough, bendable, reinforcing filament 16. Suitable materials from which trunk 14 may be manufactured will be substances which are highly flexible, resilient, easily extruded, and completely inert to water. As depicted in FIG. 2, trunk 14 preferably has a circular radial cross section for ease of manufacture, but it will be readily understood that the shape of trunk 14 is not critical and other cross-sectional configurations will suffice. FIG. 1 illustrates that, whatever its radial cross section, trunk 14 will extend longitudinally, e.g., along the length of pipe 50.

Trunk 14 preferably is solid, but may optionally include numerous minute gas cells or bubbles 12,12', as may be induced during foamed extruded manufacture of trunk 14. Gas cells 12,12' (which typically contain chemical reactants which produce a gas, such as $CO_2$) enhance the compressibility and resiliency of core 10. In all embodiments, however, trunk 14 is essentially impervious to water, such that core 10 is inert to water and non-absorbent.

Core 10 can be manufactured in an assortment of diameters, for use in pipes of nearly any diameter. The radial cross sectional area, or diameter, of core 10 is selected according to the diameter of the pipe in which it is to be installed. Selection may also depend upon the anticipated or required fluid discharge through a pipe. A typical combination may be the disposition of a ¼-inch compression core 10 within a ½-inch pipe. Smaller diameters of core 10 reduce the velocity head of fluid flowing in the pipe, while permitting the same total discharge therethrough. A larger diameter pipe may require larger diameter core 10.

Disposed within and completely surrounded by trunk 14, and preferably running along its entire length, is at least one filament 16. Filament 16 reinforces trunk 14. The preferred embodiment of core 10 incorporates a single filament 16 coaxially within trunk 14, but alternative embodiments may include a plurality of filaments 16. Filament 16, which may be a simple dacron or natural fiber twine, but which more preferably is composed of a tough, flexible, material such as Kevlar®, polypropylene, polyamide, or the like, runs along the length of core 10. Preferably, filament 16 is made of a substance imparting tremendous flexibility to filament 16—such that filament 16 may be deformed radially and laterally (i.e. bent, looped, or knotted)—but which is not subject to significant axial strain. Preferably, filament 16 is subject to insignificant strain, equal to or less than 5%, under a 50-pound axial tensile load. Thus, while very bendable, filament 16 also is very resistant to axial yield or strain, and thus when loaded in tension is not prone to longitudinal stretching. Filament 16 ideally is inert to water, minimizing its deterioration due to extended submersion.

The disposition of filament 16 within trunk 14 permits core 10 to be manufactured, stored, and used in extended lengths. Trunk 14 preferably is manufactured from a very flexible substance; yet if unreinforced, trunk 14 is flexible to the point of being difficult to manipulate and install. Additionally, unreinforced trunk 14 is subject to excessive stretching, as even the shear and propulsive forces of flowing water can stretch an unreinforced trunk 14 substantially beyond its installed length within a pipe. Reinforcing filament 16 prevents excessive stretching, so that the reinforced core 10 retains its original installed length throughout its service life.

The substance of trunk 14 may be removed from filament 16, exposing filament 16. Exposure of a short length of filament 16 from adjoining ends of two sections of core 10 allows two sections of core 10 to be joined by knotting or tying together the exposed portions of filament 16 from the respective sections of core 10.

Figure 3:
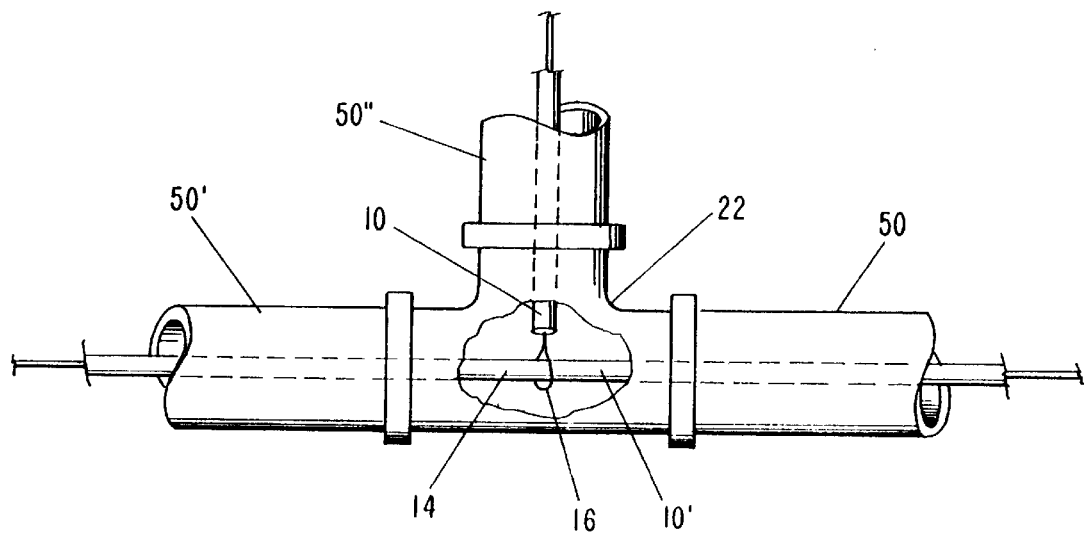
FIG. 3 is a side view of a pipeline junction, with a section broken away to show an embodiment of the invention disposed therein.

Attention is directed to FIG. 3, illustrating an advantage of the invention as it may be practiced at pipeline intersections. FIG. 3 shows a pipeline "tee" junction 22, joining pipes 50,50',50". While junction 22 is depicted as a vertical ninety-degree junction, it will be readily understood that the advantages of the invention are manifested as well in other plumbing junction and connector types, such as horizontal junctions, forty-five degree junctions, multiple-pipe (e.g., four-into-one) junctions, and the like.

As shown in FIG. 3, two sections of core 10,10' may be adapted for use in junction 22 by tying the exposed filament 16 of a first core 10 about the trunk 14 of a second core 10'. Alternatively, the first section of core 10 may be tied around second section of core 10', without exposing any filament 16. In these manners, sections of core 10 can be adapted for routing through (and protection of) nearly any plumbing system of converging, branching, and looping pipes.

Figure 4:
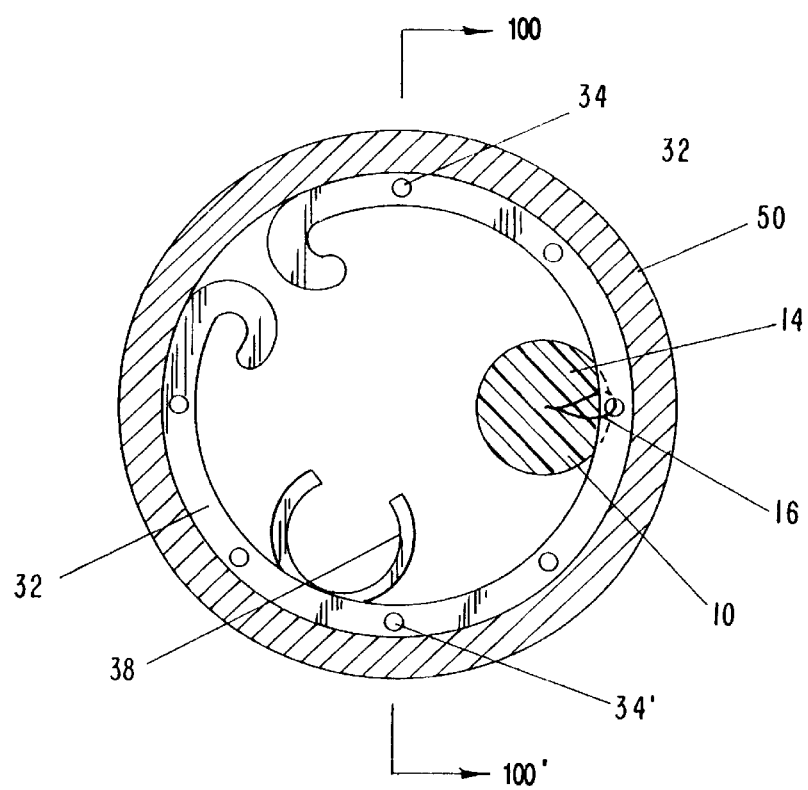
FIG. 4 is an end sectional view of an embodiment of the invention disposed within a pipe.
Figure 5:
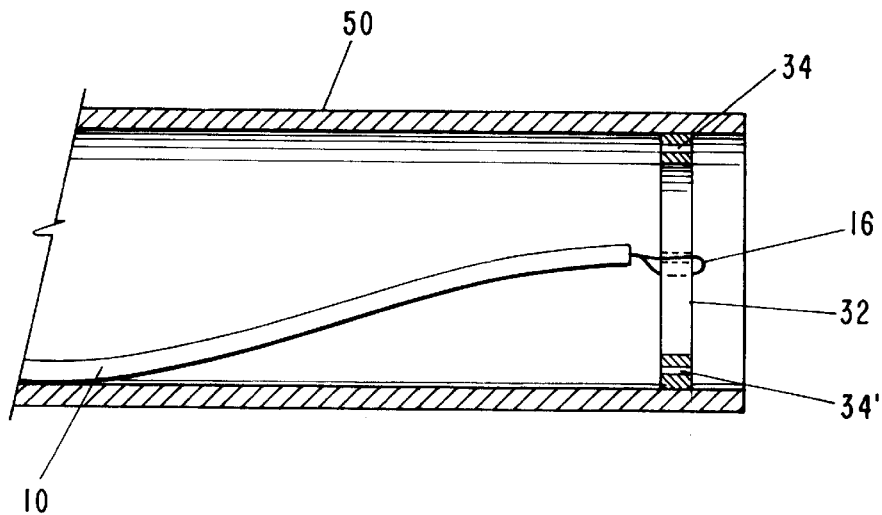
FIG. 5 is a side sectional view the FIG. 4 embodiment, taken along line 100-100'.

Reference is now made to FIGS. 4 and 5. An advantage of the apparatus of the invention is the ease with which it may be mounted within new or existing pipes. As depicted in FIGS. 4 and 5, core 10 may be attached within the interior of pipe 50 by means of an annular compression clip 32. Compression clip 32 preferably is manufactured from durable, inert, elastic plastic, but may be fashioned from stainless steel or the like. Clip 32 may be manufactured in an assortment of sizes for use in pipes of any diameter. As shown in FIG. 4, clip 32 is generally annular, but has an interruption which permits the circumference to be shortened. Due to its elastic flexibility, compression clip 32 may be temporarily compressed radially inward (partially or completely closing the interruption), thereby reducing its diameter, for insertion to the appropriate location within pipe 50. Upon release, compression clip 32 elastically expands radially outward, assuming a diameter equal to the interior diameter of the pipe in which it is placed, thereby pressing outward against the interior surface of pipe 50. As the outer circumference of the clip 32 frictionally contacts the interior surface of pipe 50, clip 32 effectively serves as a spring clamp, and thus is temporarily, but securely attached inside pipe 32. (It is apparent that proper functioning of the clip 32 requires that its uncompressed diameter be larger than the inside diameter of the pipe in which it is placed, so that clip 32 may be snapped into place.)

Compression clip 32 may have one or more anchor holes 34,34'. Anchor holes 34,34', whose function will be explained hereinafter, are drilled or otherwise formed in compression clip 32 in an axial direction through clip 32, such that the axes of the holes 34,34' are parallel to the axis of pipe 50.

With compression clip 32 attached within pipe 50, clip 32 may serve as an anchor for core 10. Continued reference is made to FIGS. 4 and 5, showing core 10 connected to clip 32 mounted within a section of pipe 50. Core 10 may be connected to clip 32 in any suitable manner. In the illustrated embodiment, a length of reinforcing filament 16 is exposed, passed through any one of one or more anchor holes 34,34' in compression clip 32, and then looped back and tied off against itself. Alternatively, as shown in FIG. 4, compression clip 32 comprises a spring clip 38, notch, or hook, or the like into which core 10 or exposed filament 16 may be inserted, or around which exposed filament 16 may be tied. Other methods of connecting core 10 to compression clip 32 will be readily apparent.

An advantage of the invention is that core 10 may be removed from pipe 50 for any reason (e.g., pipeline cleaning, pipeline rehabilitation or inspection, core replacement) by the simple expedient of squeezing compression clip 32 to reduce its diameter, and then slipping or extracting it from the pipe 50. Replacement of the same or a new core 10 likewise may easily be accomplished.

Another advantage of the invention thus is that it may be used within lines transporting potable water. The invention is sanitary, and does not require the use of lead solder, hydrocarbon-based glues or the like that may degrade water quality. The physical integrity of core 10 precludes any foreign solid particles from breaking away into the water. The invention may therefor be practiced in ultra-clean or specialized industrial systems bearing distilled, purified, or other specially-treated water, without adversely impacting the transported fluid. No dissociated metal ions are imparted to flowing water.

Accordingly, the apparatus of the invention includes extended lengths of core 10 reinforced by filament 16. Core 10 may be manufactured by the extrusion of trunk 14 with filament 16 therein. Lengths of finished core 10 may be stored and transported on spools (e.g. 50-foot, 100-foot, 1000-foot lengths of core 10 rolled around appropriately sized spools). Core 10 may then be paid out from a rotating spool at the rate it is used. Finished core 10 may be disposed within pipes at the time of pipe manufacture, but most preferably will be attached within new pipes concurrently with pipeline installation (e.g., within walls, underground). Alternatively, core 10 may also be installed in existing pipes of any condition.

Core 10 may be installed within existing pipelines by cutting or opening a pair or pipe fittings or junctions some distance apart along the pipeline. Core 10 may then be pulled or "fished" through the line from one opened fitting to the other. Disposition of the core 10 may include passing or pulling it through any number of pipe bends, traps, and angles, since the flexibility of core 10 allows it to conform to even elaborately contorted pipe systems. After the length of core 10 has been pulled through a length of pipeline, core 10 may be cut, and one or both ends thereof may be attached to the pipe 50 using compression clips 32 or other means.

Figure 6:
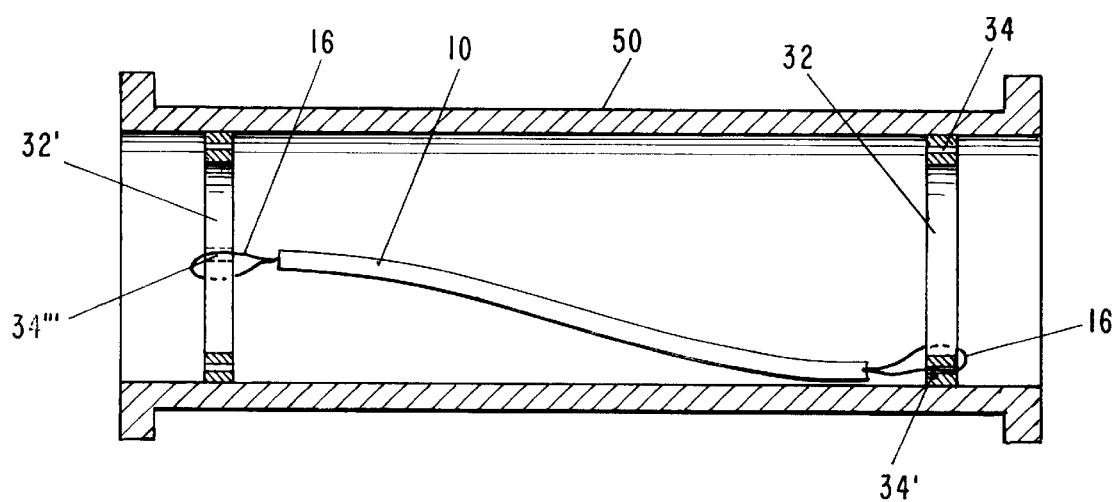
FIG. 6 is a side sectional view of an alternative to the FIG. 5 embodiment.

FIG. 6, for example, illustrates a length of core 10 installed within pipe 50 using a pair of compression clips 32,32'. A length of filament 16 is exposed at each end of core 10, passed through an anchor hole 34' and 34''' in each clip 32,32' and tied off. Each end of core is thereby secured, while the core 10 may move laterally about within pipe 50 in response to fluid currents. Alternatively, as shown in FIG. 5, it may be desirable to secure only one end of core 10 to pipe 50, leaving the second (downstream) end unattached, and free to drift and move with fluid currents.

Figure 8:
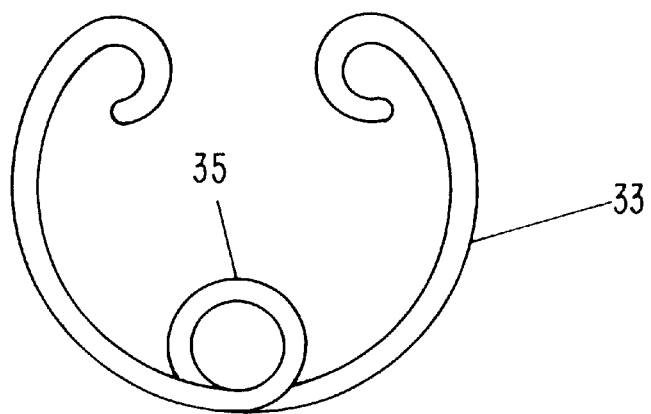
FIG. 8 is top view of a looped compression clip which provides the preferred attachment means of the invention.
Figure 9:
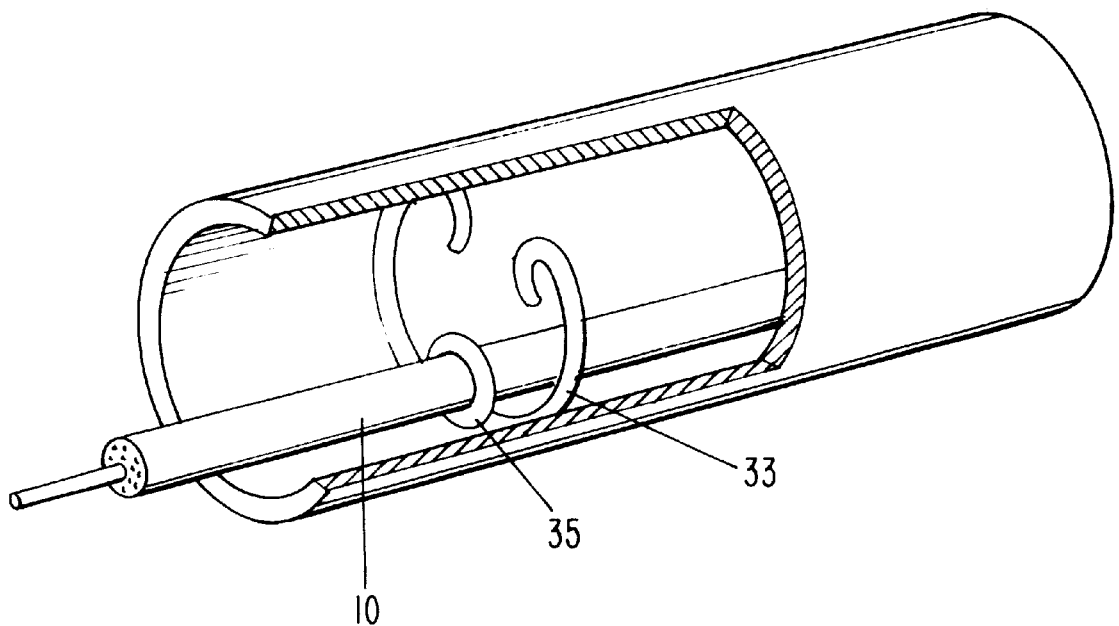
FIG. 9 is a perspective view of the invention employing the clip of FIG. 8.

FIGS. 8 and 9 illustrate a looped compression clip 33 as the attachment means. In this embodiment, clip 33 comprises a loop 35 through which core 10 is squeezed, thereby securing it. Clips 33 are preferably formed of stainless steel, type 302, spring wire. This provides what is believed to be the most secure yet economical manner in which to secure core 10 within the pipe. The clip may have (shown), but preferably does not have (not shown) an interruption which permits the circumference to be shortened.

Alternatively, securement of the core may be made by a variety of other means. This includes a flat compression clip of inert material (metal or plastic) having a looped section at the base opening outward, so that the core is secured up against the wall. The core may be secured at a pipe joint by tying reinforcing twine to the core and squeezing a twine pigtail therefrom between the joint for anchoring. A metal or plastic clip with a bent pigtail can also be used.

Figure 10:
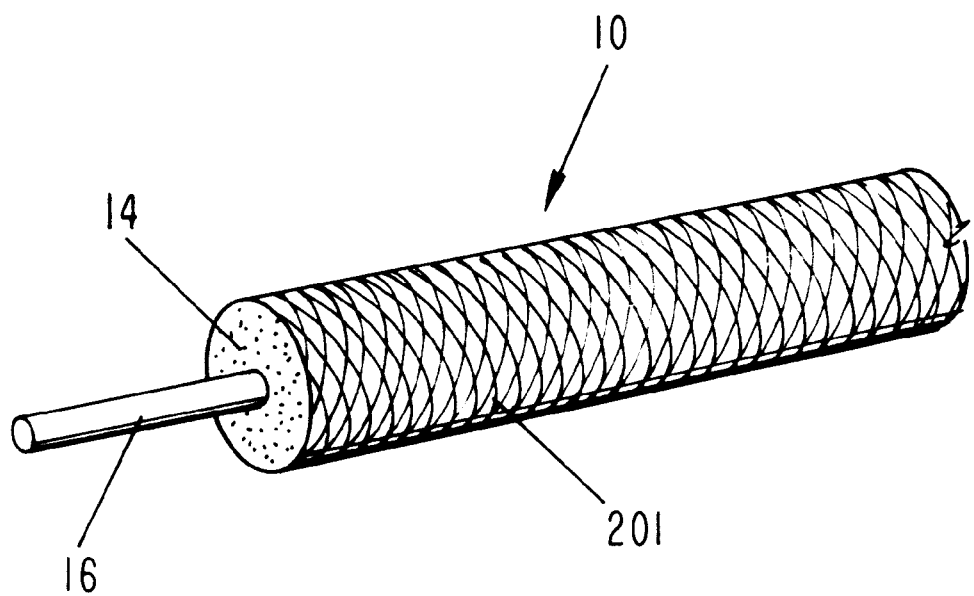
FIG. 10 is a cut-away perspective view of a first core construction to reduce abrasion of the core.
Figure 11:
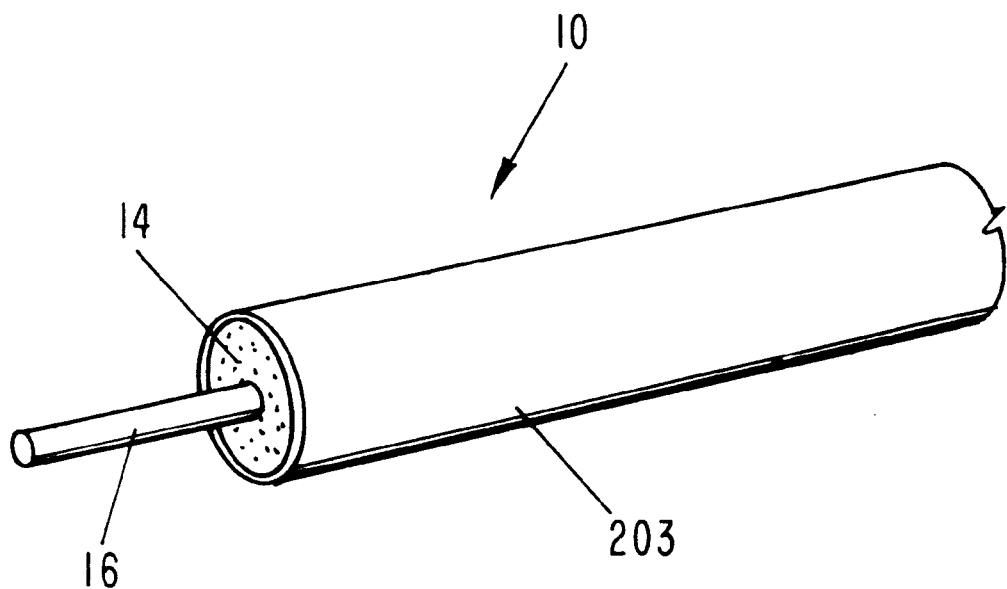
FIG. 11 is a cut-away perspective view of a second core construction to reduce abrasion of the core.

FIGS. 10 and 11 illustrate manners in which abrasion of core 10 may be reduced. FIG. 10 illustrates the use of weaving or webbing 201 (preferably of a material such as dacron or the like) surrounding the sponge or foam body of the core. Filament 16 may be used in this embodiment, but is not required. Weaving or webbing 201 both strengthens the core body and aids in abrasion resistance of the core surface. FIG. 11 illustrates the use of an outer core jacket 203 (preferably of a tough material such as vinyl). Again, filament 16 is not a required element. The core 10 may be formed by a co-extrusion process, in which the central sponge elastomer of the core may be extruded within the outer core jacket. Alternatively, the central sponse elastomer may be slipped into a tube of other material, such as Tygon® vinyl hose material or a tough rubber. The outer core jacket protects against abrasion, adds reinforcing properties to the core, and prevents stretching of the core.

Figure 7:
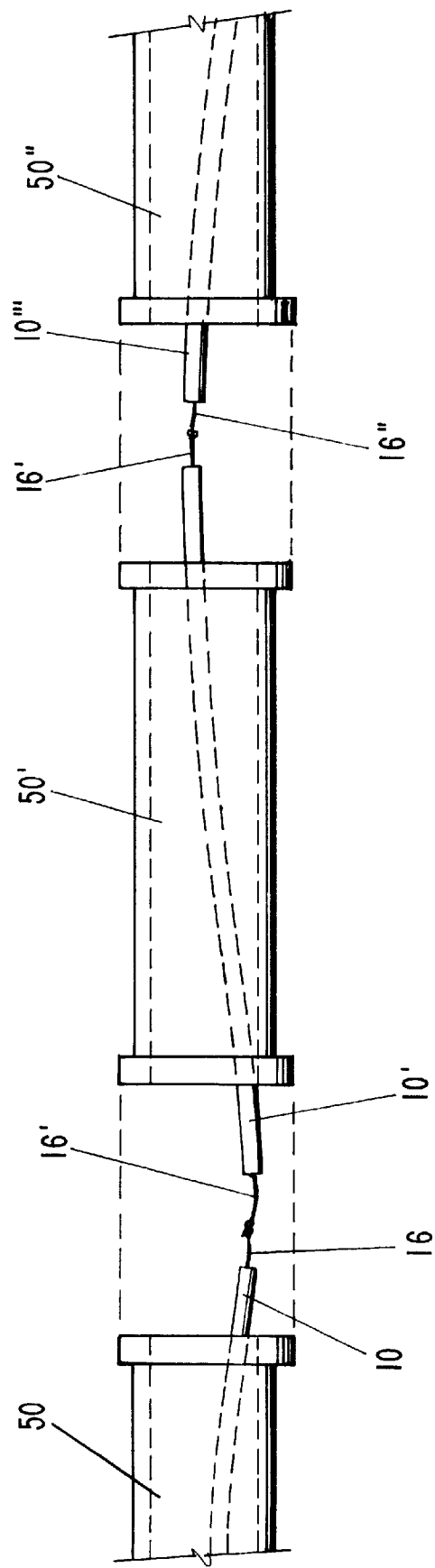
FIG. 7 is an side view of an alternative embodiment of the invention disposed within a pipeline, with the pipeline exploded to reveal the invention.

In yet another application of the invention, one or both ends of the core 10 may be tied or otherwise connected to another similarly situated length of core 10. FIG. 7 shows that separate sections of core 10,10',10" may be connected in series, if desired, by tying together respective lengths of exposed filament 16,16',16". The opened fitting or junction then be closed and sealed, leaving the installed core 10 completely within the joined sections of pipe 50,50',50". The process of opening a section of line, disposing core 10 therethrough, attaching one or both ends of the length of core 10 to the pipe 50 or to another length of core, and then closing the openings in the line may be repeated throughout the length of the pipeline, thereby treating entire lines. Fittings that may be opened and closed to accomplish installation include tee-joints, Y-joints, forks, elbows, valve fittings, and the like, as may be indicated or required. Alternatively, existing pipes may be split or even sawed open, if needed for core 10 installation, and then closed with a dresser coupling.

Thus, numerous sections of severed core 10 may be connected end-to-end in series, as well as connected in joints (FIG. 3), to treat an entire pipeline system or vulnerable portion thereof. Sections of core 10 are attached to the inside of pipe 50 at intermittent and various points, preferably by conveniently located compression clips 32 or other means. Except as attached at specific points, however, core 10 throughout most its length is free to drift, shift, and move laterally/radially about within pipe 50 in response to fluid current. Axial movement along the line is prevented by the connection of core 10 to the pipe 50. Clamps or attachment devices such as compression clips 32 and 33 also prevent the installed core from shifting longitudinally within the line, which shifting could otherwise interfere with the operation of valves, pumps, and the like situated along the length of the line.

The invention may be practiced within pipes made of practically any material, including but not limited to PVC pipes, copper pipes, galvanized pipes, cast iron, or stainless steel. Thus, the invention finds useful application in practically any type of pipe presently encountered in the art; no new type of pipe or pipe liner need be developed to accommodate the practice of the invention.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of protecting a pipeline against damage resulting from excessive internal pressures, the method comprising the steps of:
   (a) providing a core comprising:
      a flexible, compressible, resilient trunk comprising a composition inert to water; and
      at least one flexible reinforcing filament, comprising a composition inert to water, disposed within the trunk; and
   (b) disposing the core within the pipeline; and
   (c) attaching a first portion of the core to the pipe by:
      (1) placing a first, substantially planar, compression clip within the pipe; and
      (2) securing the core to the first compression clip by tying the core to the first compression clip.

2. The method of claim 1 further comprising the step of:
   (d) attaching a second portion of the core to the pipe by:
      (1) placing a second, substantially planar, compression clip within the pipe; and
      (2) securing the core to the second looped compression clip.

3. The method of claim 1 wherein the step of placing a first compression clip comprises placing a looped compression clip.

4. The method of claim 3 wherein the step of securing the core comprises securing the core through a loop of the looped compression clip.

5. An apparatus for protecting a pipeline against damage resulting from excessive internal pressures, said apparatus comprising:
   a core comprising a flexible, compressible, resilient trunk comprising a composition inert to water, and at least one flexible reinforcing filament, comprising a composition inert to water, disposed within said trunk; and
   said core disposed within the pipeline, a first portion of said core attached to the pipe by attachment to a first, substantially planar, looped compression clip disposed within the pipe, said loop sized to securely hold said core when said core is squeezed through said loop.

6. The apparatus of claim 5 wherein said first compression clip and said core comprise means for tying said core to said first compression clip.

7. The apparatus of claim 5 further comprising a second portion of the core attached to the pipe by attachment to a second, substantially planar, compression clip disposed within the pipe.

8. An apparatus for protecting a pipeline against damage resulting from excessive internal pressures, said apparatus comprising:

a core comprising a flexible, compressible, resilient trunk comprising a composition inert to water, and a reinforcing jacket, comprising a composition inert to water, disposed around said trunk; and said core disposed within the pipeline, a first portion of said core attached to the pipe by attachment to a first, substantially planar, looped compression clip disposed within the pipe said loop sized to securely hold said core when said core is squeezed through said loop.

9. The apparatus of claim 8 wherein said reinforcing jacket comprises a durable material inert to water selected from the group consisting of vinyls, rubbers, elastomers, woven filaments, and webbing.

10. The apparatus of claim 8 further comprising a second portion of the core attached to the pipe by attachment to a second, substantially planar, compression clip disposed within the pipe.

* * * * *